(12) United States Patent
Weiss

(10) Patent No.: US 10,372,609 B2
(45) Date of Patent: Aug. 6, 2019

(54) FAST CACHE WARM-UP

(71) Applicant: Intel Corporation, Santa Clara, CA (US)

(72) Inventor: Sagi Weiss, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/704,130

(22) Filed: Sep. 14, 2017

(65) Prior Publication Data

US 2019/0079866 A1   Mar. 14, 2019

(51) Int. Cl.
| G06F 12/08 | (2016.01) |
| G06F 13/00 | (2006.01) |
| G06F 13/28 | (2006.01) |
| G06F 12/0811 | (2016.01) |
| G06F 12/0817 | (2016.01) |
| G06F 12/0877 | (2016.01) |

(52) U.S. Cl.
CPC ........ G06F 12/0811 (2013.01); G06F 12/082 (2013.01); G06F 12/0877 (2013.01); *G06F 2212/6012* (2013.01)

(58) Field of Classification Search
CPC . G06F 12/082; G06F 12/0811; G06F 12/0877
USPC .................................................. 711/122
See application file for complete search history.

(56) References Cited

U.S. PATENT DOCUMENTS

| 8,612,676 | B2 | 12/2013 | Dahlen et al. | |
| 2008/0235453 | A1* | 9/2008 | Emma | G06F 12/0862 711/122 |
| 2009/0235032 | A1* | 9/2009 | Hoane, Jr. | G06F 12/0802 711/141 |
| 2015/0081980 | A1* | 3/2015 | Walker | G06F 12/0802 711/135 |
| 2015/0293709 | A1* | 10/2015 | Quach | G06F 13/1605 711/105 |
| 2017/0257101 | A1* | 9/2017 | Zhang | H03K 19/1776 |
| 2017/0322771 | A1* | 11/2017 | Zhang | G06F 7/4988 |
| 2018/0041216 | A1* | 2/2018 | Zhang | G11C 5/025 |

* cited by examiner

*Primary Examiner* — Mohamed M Gebril
(74) *Attorney, Agent, or Firm* — Jordan IP Law, LLC

(57) ABSTRACT

An embodiment of a semiconductor package apparatus may include technology to determine if a memory request for a second level memory results in a miss with respect to a first level memory, determine if a range of the second level memory corresponding to the memory request is unwritten, if the memory request results in the miss with respect to the first level memory, and blank a corresponding range of the first level memory if the range of the second level memory corresponding to the memory request is determined to be unwritten. Other embodiments are disclosed and claimed.

24 Claims, 5 Drawing Sheets

FAST CACHE WARM-UP

TECHNICAL FIELD

Embodiments generally relate to memory systems, and more particularly, embodiments relate to a fast cache warm-up.

BACKGROUND

Computing systems or platforms may utilize various memory arrangements. A two-level memory (2LM) system may include near memory (NM) and far memory (FM).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
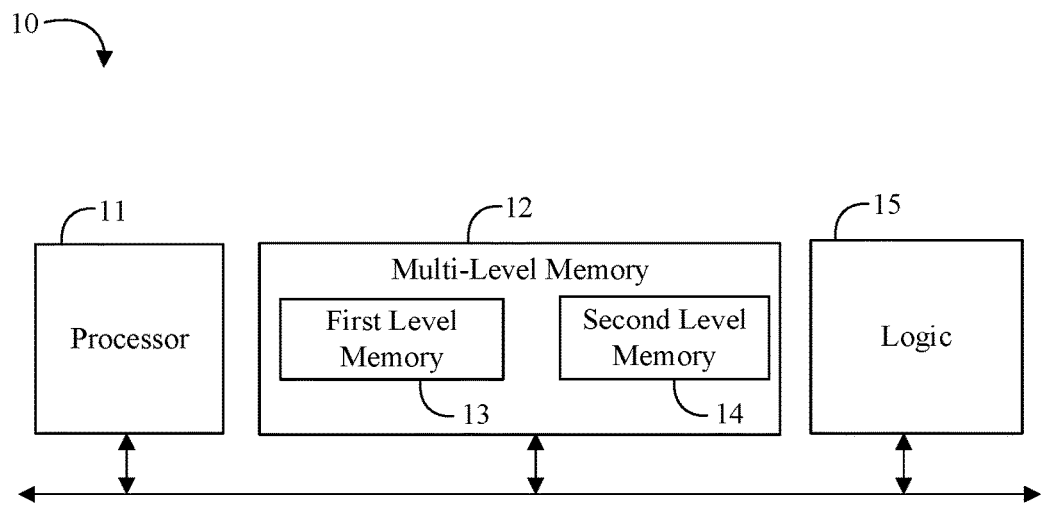
FIG. 1 is a block diagram of an example of an electronic processing system according to an embodiment.

Turning now to FIG. 1, an embodiment of an electronic processing system 10 may include a processor 11, a multi-level memory 12 communicatively coupled to the processor 11, the multi-level memory 12 including a first level memory 13 and a second level memory 14, and logic 15 communicatively coupled to the processor 11 and the multi-level memory 12 to determine if a memory request for the second level memory 14 results in a miss with respect to the first level memory 13, determine if a range of the second level memory 14 corresponding to the memory request is unwritten (e.g., if the memory request results in the miss with respect to the first level memory 13), and blank a corresponding range of the first level memory 13 if the range of the second level memory 14 corresponding to the memory request is determined to be unwritten.

In some embodiments, the logic 15 may be configured to set an indicator flag to indicate whether or not a range of the second level memory 14 is unwritten. For example, the logic 15 may also be configured to determine if the range of the second level memory 14 corresponding to the memory request is unwritten based on the indicator flag, and/or to zero the corresponding range of the first level memory 13 if the indicator flag indicates that the range of the second level memory 14 corresponding to the memory request is unwritten. In some embodiments, the logic 15 may be configured to determine if the range of the second level memory 14 corresponding to the memory request is unwritten based on an indicator bit in a tag array. In any of the embodiments herein, a size of the range of the second level memory 14 may correspond to any of a size of the entire second level memory, a size of a pre-determined address range, a size of a super line, a size of a set of ways, and/or a size of a subset of ways. In some embodiments, the logic 15 may be located in, or co-located with, various components, including the processor 11 (e.g., on a same die).

Embodiments of each of the above processor 11, multi-level memory 12, first level memory 13, second level memory 14, logic 15, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the multi-level memory 12, persistent storage media, or other system memory may store a set of instructions which when executed by the processor 11 cause the system 10 to implement one or more components, features, or aspects of the system 10 (e.g., the logic 15, determining if a memory request for the second level memory 14 results in a miss with respect to the first level memory 13, determining if a range of the second level memory 14 corresponding to the memory request is unwritten, blanking a corresponding range of the first level memory 13 if the range of the second level memory 14 corresponding to the memory request is determined to be unwritten, etc.).

Figure 2:
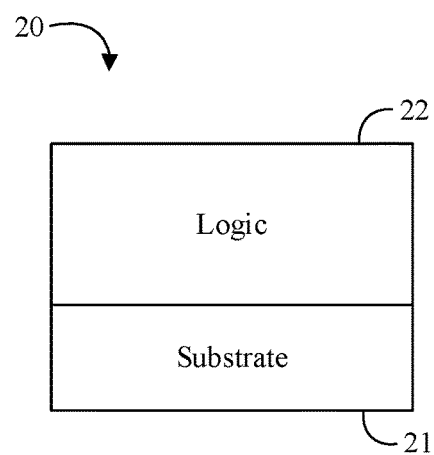
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, where the logic 22 is at least partly implemented in one or more of configurable logic and fixed-functionality hardware logic. The logic 22 coupled to the substrate 21 may be configured to determine if a memory request for a second level memory results in a miss with respect to a first level memory, determine if a range of the second level memory corresponding to the memory request is unwritten, if the memory request results in the miss with respect to the first level memory, and blank a corresponding range of the first level memory if the range of the second level memory corresponding to the memory request is determined to be unwritten.

In some embodiments, the logic 22 may be configured to set an indicator flag to indicate whether or not a range of the second level memory is unwritten. For example, the logic 22 may also be configured to determine if the range of the second level memory corresponding to the memory request is unwritten based on the indicator flag, and/or to zero the corresponding range of the first level memory if the indicator flag indicates that the range of the second level memory corresponding to the memory request is unwritten. In some embodiments, the logic 22 may be configured to determine if the range of the second level memory corresponding to the memory request is unwritten based on an indicator bit in a tag array. For example, a size of the range of the second level memory may correspond to any of a size of the entire second level memory, a size of a pre-determined address range, a size of a super line, a size of a set of ways, and/or a size of a subset of ways.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
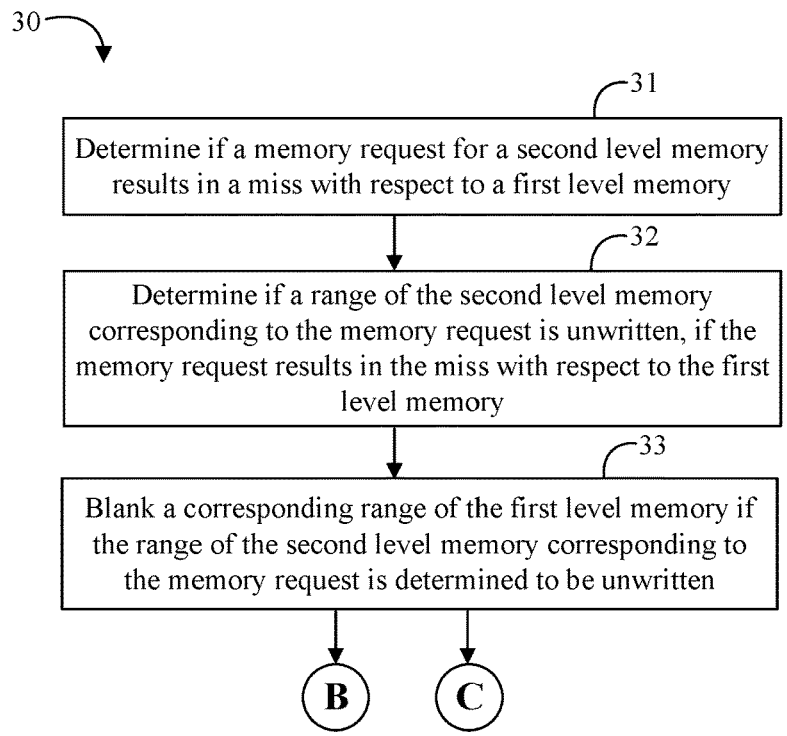
FIGS. 3A to 3C are flowcharts of an example of a method of controlling a memory according to an embodiment.
Figure 3B:
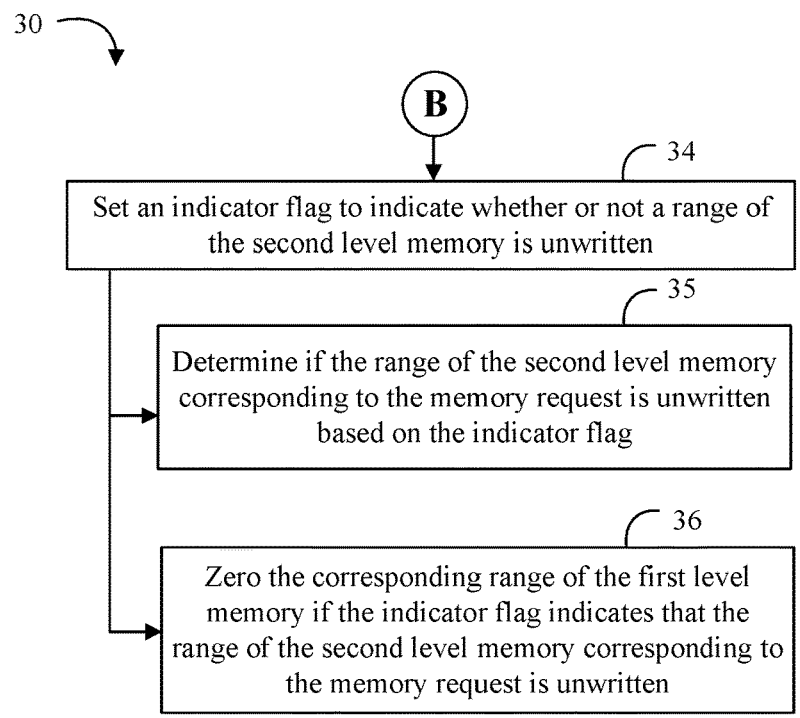
Figure 3C:
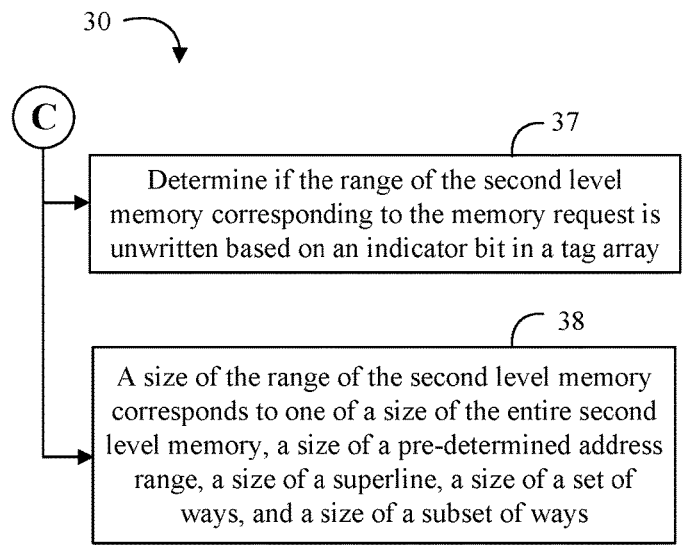

Turning now to FIGS. 3A to 3C, an embodiment of a method 30 of controlling a memory may include determining if a memory request for a second level memory results in a miss with respect to a first level memory at block 31, determining if a range of the second level memory corresponding to the memory request is unwritten, if the memory request results in the miss with respect to the first level memory at block 32, and blanking a corresponding range of the first level memory if the range of the second level memory corresponding to the memory request is determined to be unwritten at block 33. In some embodiments, the method 30 may include setting an indicator flag to indicate whether or not a range of the second level memory is unwritten at block 34. For example, the method 30 may also include determining if the range of the second level memory corresponding to the memory request is unwritten based on the indicator flag at block 35, and/or zeroing the corresponding range of the first level memory if the indicator flag indicates that the range of the second level memory corresponding to the memory request is unwritten at block 36. Some embodiments of the method 30 may include determining if the range of the second level memory corresponding to the memory request is unwritten based on an indicator bit in a tag array at block 37. For example, a size of the range of the second level memory corresponds to one of a size of the entire second level memory, a size of a pre-determined address range, a size of a super line, a size of a set of ways, and a size of a subset of ways at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
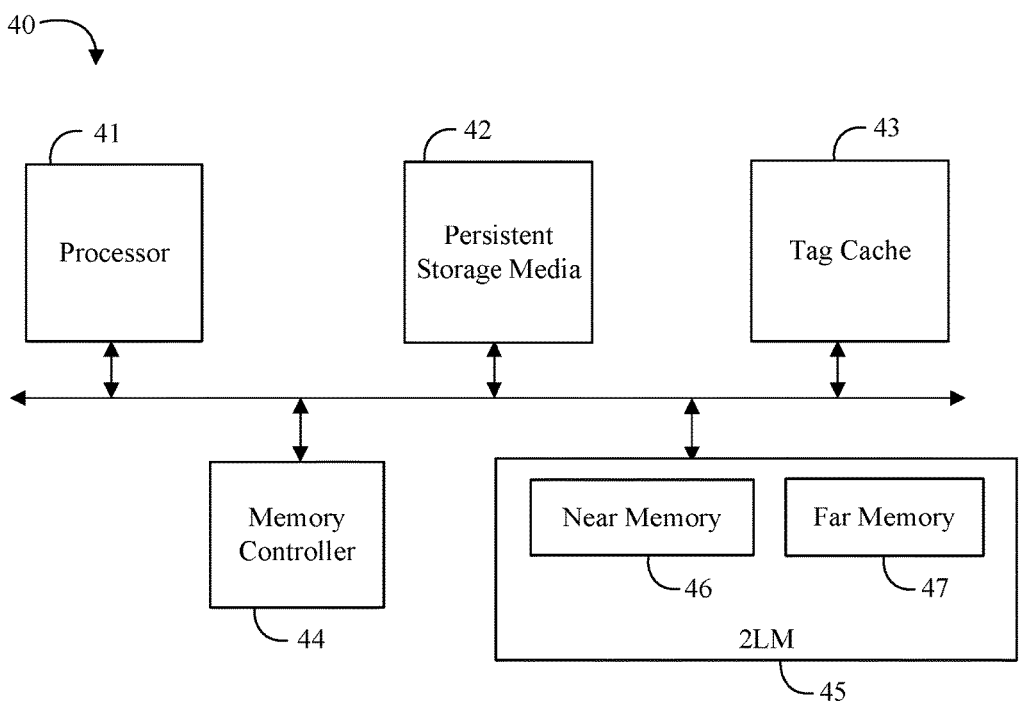
FIG. 4 is a block diagram of another example of an electronic processing system according to an embodiment.

Turning now to FIG. 4, an embodiment of an electronic processing system 40 may include a processor 41, persistent storage media 42 communicatively coupled to the processor 41, a tag cache 43 to cache tag information, a memory controller 44, and a two-level memory (2LM) 45 including a near memory 46 and a far memory 47. The tag cache 43 may be configured to cache metadata and/or tag information of the near memory 46 of the 2LM 45 (e.g., stored in the form of a tag array). In various embodiments, any of the near memory 46 and the far memory 47 may include nonvolatile memory (NVM) and/or volatile memory. For example, the 2LM 45 may correspond to system memory or main memory including the near memory 46 and the far memory 47. The near memory 46 may include smaller, faster DRAM. The far memory 47 may include larger storage capacity NVM (e.g., a byte-addressable 3D crosspoint memory).

The memory controller 44 may be communicatively coupled to the processor 41, the tag cache 43, and the 2LM 45. In some embodiments, the memory controller 44 may be configured to determine if a memory request for the far memory 47 results in a miss with respect to the near memory 46, determine if a range of the far memory 47 corresponding to the memory request is unwritten (e.g., if the memory request results in the miss with respect to the near memory 46), and blank a corresponding range of the near memory 46 if the range of the far memory 47 corresponding to the memory request is determined to be unwritten. In some embodiments, the memory controller 44 may be configured to set an indicator flag to indicate whether or not a range of the far memory 47 is unwritten. For example, the memory controller 44 may also be configured to determine if the range of the far memory 47 corresponding to the memory request is unwritten based on the indicator flag, and/or to zero the corresponding range of the near memory 46 if the indicator flag indicates that the range of the far memory 47 corresponding to the memory request is unwritten. In some embodiments, the memory controller 44 may be configured to determine if the range of the far memory 47 corresponding to the memory request is unwritten based on an indicator bit in a tag array stored in the tag cache 43. In any of the embodiments herein, a size of the range of the far memory 47 may correspond to any of a size of the entire second level memory, a size of a pre-determined address range, a size of a super line, a size of a set of ways, and/or a size of a subset of ways.

In some embodiments, the memory controller 44 and the tag cache may be integrated on a same die as the processor 41, while the near and far memories 46, 47 may be separate components. In some embodiments, the near memory 46 and the far memory 47 may have different interfaces with the processor 41, and may not share a bus. In some embodiments, the far memory 47 may be integrated with the persistent storage media 42. For example, the persistent storage media 42 may be logically or physically divided with a portion for the far memory 47 and a portion for mass storage. Alternatively, or additionally, all or part of the far memory 47 may be separate from the persistent storage media 42 and may include other NVM and/or volatile memory (e.g., DDR compliant DRAM or SDRAM).

Embodiments of the processor 41, the persistent storage media 42, the tag cache 43, the memory controller 44, the 2LM 45, the near memory 46, the far memory 47, and other components of the system 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide a fast cache warm-up. A 2LM may include a near memory (NM) which may be smaller and faster, and a far memory (FM) which may be larger and slower. The FM size may be the size of the available memory from the OS perspective and the NM may serve as a cache. In some embodiments, the NM may be placed outside the central processor unit (CPU) die. During operation, each miss in the NM may cause data to be brought in from the FM and then fill the data in the NM. In some embodiments, the granularity of data saving (e.g., valid bits) in the NM may be referred to as a super line (e.g., for 1 KB of information, 4 KB of information, etc.). A super line (SPL) may be utilized, for example, to decrease the tag array size and/or because of the FM read granularity. In these embodiments, even for a single address read/write miss in the NM, the corresponding SPL may be brought in from the FM to fill in the data in the NM. Some other systems may always perform a read from FM after the cache miss, even if the data is blank or zeros because the requested region has not yet been written to. Advantageously, some embodiments may selectively avoid bringing the data in from the FM if the requested data corresponds to an SPL which is determined to be unwritten.

For example, in some embodiments the 2LM may serve as the system memory or main memory for the system. The main memory may be blank at system startup or after a cold reset. For some period of time after a cold reset, all the initial write requests will cause misses in the NM. In some other systems, all of those initial writes will cause a correspondingly large number of fetches from the FM (e.g., all of which will bring zeros or invalid data). Some embodiments may save the system from performing reads from unwritten portions of the FM (e.g., ranges of the FM that have not yet been written to even once) and warm-up the NM much quicker, advantageously improving performance and also saving power. Some embodiments may also improve boot performance (e.g., faster wake up).

Figure 5:
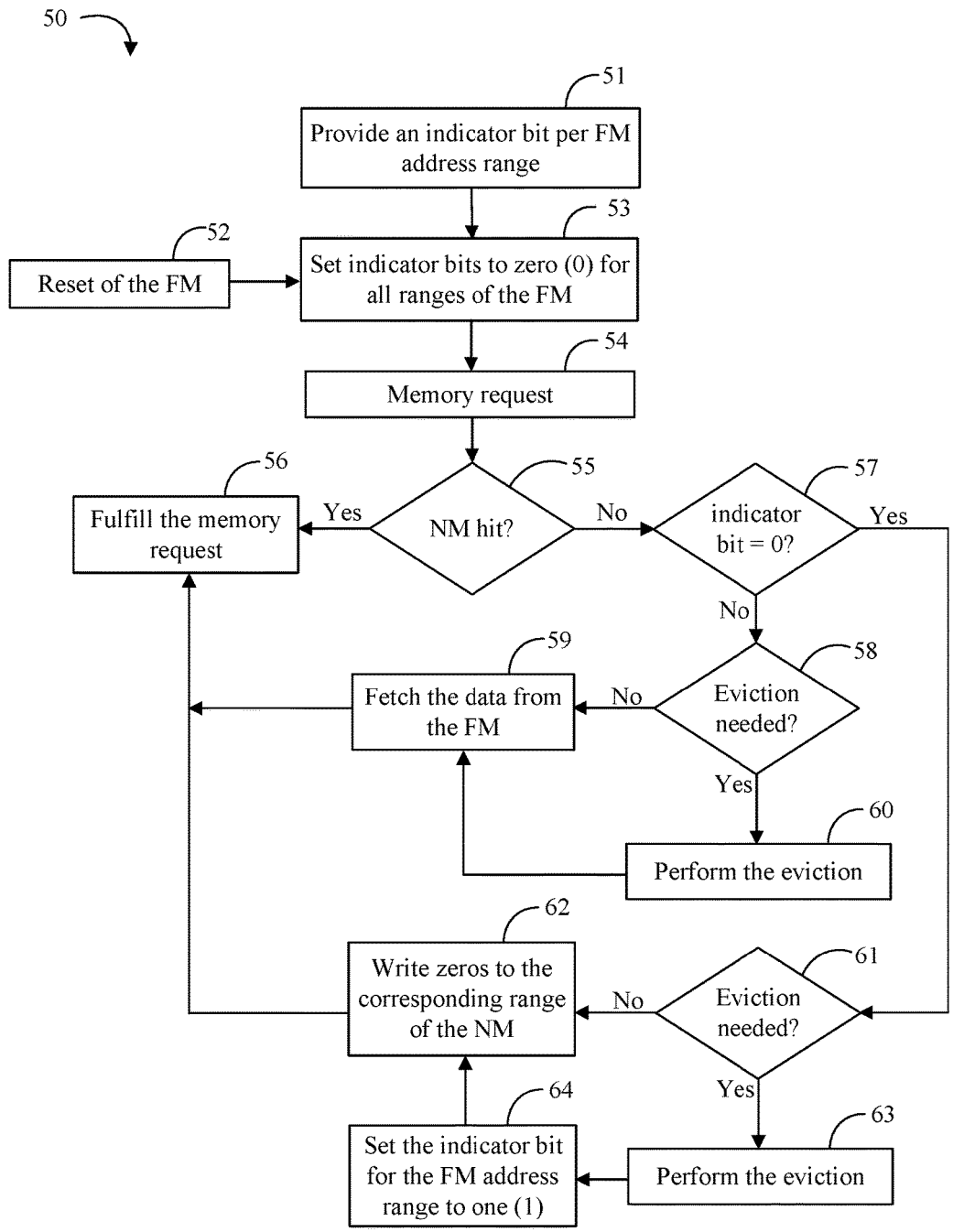
FIG. 5 is a flowchart of an example of a method of warming up a cache according to an embodiment.

Turning now to FIG. 5, an embodiment of a method 50 of warming up a cache may include providing an indicator bit per FM address range at block 51. For example, the indicator bit may indicate that cache eviction to the FM has happened to the associated range. After a reset of the FM at block 52, the indicator bits may be set to zero (0) for all ranges of the FM at block 53. The indicator block may stay equal to zero (0) until some eviction has happened to the associated range (e.g., eviction may correspond to scrubbing data from the NM to the FM) or until some other process forces a write to the FM (e.g., a transition to a sleep state). A memory request may occur at block 54. If the memory request results in a hit for the NM at block 55, the method 50 may then fulfill the memory request at block 56. If the memory request results in a miss for the NM at block 55, the method 50 may then determine what is indicated by the indicator bit for the FM address range at block 57. If the indicator bit equals one (1) at block 57, the method 50 may then determine if an eviction is needed at block 58. If the eviction is not needed at block 58, the method 50 may then fetch the data from the FM at block 59 and fulfill the request at block 56. If the eviction is needed at block 58, the method 50 may perform the eviction at block 60, and then fetch the data from the FM at block 59 and fulfill the request at block 56.

If the indicator bit is equal to zero (0) at block 57, the method 50 may then determine if an eviction is needed at block 61. If the eviction is not needed at block 61, the method 50 may write zeros to the corresponding range of the NM at block 62 and then fulfill the request at block 56. If the eviction is needed at block 61, the method 50 may perform the eviction at block 63, and then set the indicator bit for the FM address range to one (1) at block 64. The method 50 may then write zeros to the corresponding range of the NM at block 62 and fulfill the request at block 56. Because the indicator bit is zero, the data that would have been brought from the FM (e.g., for each request miss) would be zeros or invalid data because the FM address range had not yet been written to with valid data. Advantageously, some embodiments of the method 50 may cancel these reads from the FM and just write zeros to the NM instead. Advantageously, in some embodiments the NM may warm up very fast and may save a significant amount of data traffic from the FM (e.g., improving boot performance and saving power). Some embodiments may also advantageously improve data integrity and/or security by writing zeros to the NM instead potentially bringing garbage data into the NM from the FM (e.g., because the FM had not yet been written to with valid data). If the FM is reset again (e.g., at block 52), all the indication bits may also be reset again (e.g., at block 53).

In accordance with some embodiments, the size of the FM address ranges associated with the indicator flag may be selected as needed for a particular system/design. For example, a single bit may provide an indicator flag for the entire range of the FM (e.g., the bit will stay set until the first eviction from the NM). An indicator bit may be provided for each few megabyte address range (e.g., 2 MB, 4 MB, etc.). An indicator bit may be provided for each SPL. In some embodiments, the indicator flag may include multiple bits to provide finer indications within the associated address range. Providing more indicator bits may provide a finer grain capability to avoid fetching data from the FM, potentially providing greater savings.

In some embodiments, the address ranges may not necessarily be successive. For example, some embodiments may include one or more indicator bits per set of ways. The NM may be logically and/or physically divided into sets and each set may include a number of ways according to some associativity (e.g., a 16-way set associative cache may include 16 ways per set). Providing one indicator bit per set may save an amount of zeros read from the FM corresponding to about the size of the NM. Providing more than one indicator bit per set may allow some embodiments to avoid fetching zeros from the FM according to sub-addresses or subsets within the set of ways.

Figure 6:
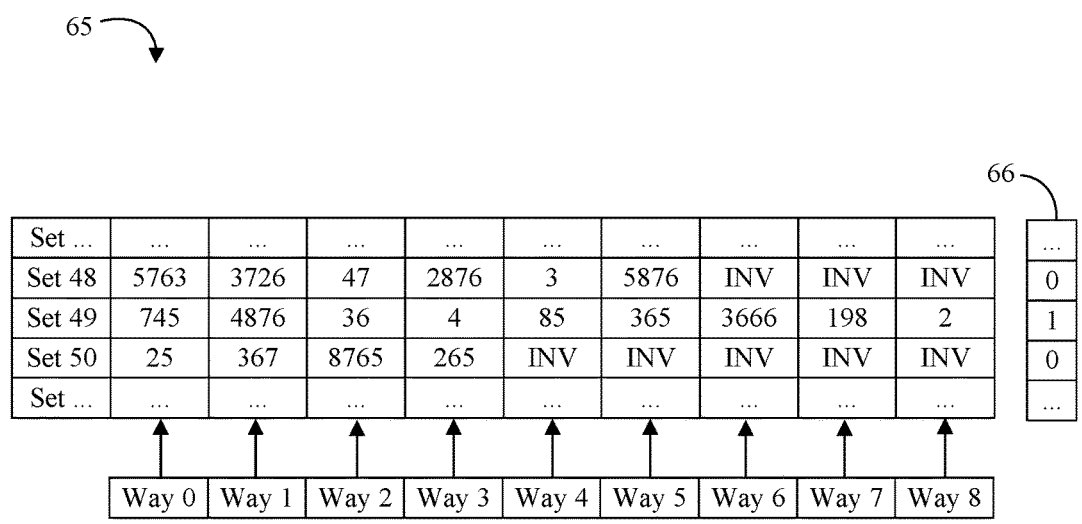
FIG. 6 is an illustrative diagram of an example of a tag array including an indicator bit according to an embodiment.

Turning now to FIG. 6, an embodiment of a NM tag array 65 may include a number of sets, with each set including 8 ways. An indicator bit 66 may be provided for each set. Initially, all of the indicator bits are set to zero (0). When all of the ways of a set have been filled, a subsequent memory request for that set may cause an eviction of data from the NM to the FM. When such an eviction happens, the associated indicator bit may be set to one (1). As illustrated, for example, set 49 may have had an eviction happen and its associated indicator bit is set to one (1).

Some embodiments may be able to determine that the associated range of FM is unwritten without using an indicator flag or bit. For example, some embodiments may be configured such that eviction won't happen before all ways of a set are occupied. Accordingly, some embodiments may determine that the FM associated with a set of ways is unwritten by determining if any of the ways of the set are unoccupied or invalid. Referring to FIG. 6, for example, sets 48 and sets 50 each include ways that are invalid (e.g., labeled as INV). Some embodiments may use the presence of an invalid way to determine that the FM range associated with sets 48 and 50 are unwritten (e.g., without reference to any indicator bit).

Additional Notes and Examples:

Example 1 may include an electronic processing system, comprising a processor, a multi-level memory communicatively coupled to the processor, the multi-level memory including a first level memory and a second level memory, and logic communicatively coupled to the processor and the multi-level memory to determine if a memory request for the second level memory results in a miss with respect to the first level memory, determine if a range of the second level memory corresponding to the memory request is unwritten, if the memory request results in the miss with respect to the first level memory, and blank a corresponding range of the first level memory if the range of the second level memory corresponding to the memory request is determined to be unwritten.

Example 2 may include the system of Example 1, wherein the logic is further to set an indicator flag to indicate whether or not a range of the second level memory is unwritten.

Example 3 may include the system of Example 2, wherein the logic is further to determine if the range of the second level memory corresponding to the memory request is unwritten based on the indicator flag.

Example 4 may include the system of Example 2, wherein the logic is further to zero the corresponding range of the first level memory if the indicator flag indicates that the range of the second level memory corresponding to the memory request is unwritten.

Example 5 may include the system of Example 1, wherein the logic is further to determine if the range of the second level memory corresponding to the memory request is unwritten based on an indicator bit in a tag array.

Example 6 may include the system of any of Examples 1 to 5, wherein a size of the range of the second level memory corresponds to one of a size of the entire second level memory, a size of a pre-determined address range, a size of a super line, a size of a set of ways, and a size of a subset of ways.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to determine if a memory request for a second level memory results in a miss with respect to a first level memory, determine if a range of the second level memory corresponding to the memory request is unwritten, if the memory request results in the miss with respect to the first level memory, and blank a corresponding range of the first level memory if the range of the second level memory corresponding to the memory request is determined to be unwritten.

Example 8 may include the apparatus of Example 7, wherein the logic is further to set an indicator flag to indicate whether or not a range of the second level memory is unwritten.

Example 9 may include the apparatus of Example 8, wherein the logic is further to determine if the range of the second level memory corresponding to the memory request is unwritten based on the indicator flag.

Example 10 may include the apparatus of Example 8, wherein the logic is further to zero the corresponding range of the first level memory if the indicator flag indicates that the range of the second level memory corresponding to the memory request is unwritten.

Example 11 may include the apparatus of Example 7, wherein the logic is further to determine if the range of the second level memory corresponding to the memory request is unwritten based on an indicator bit in a tag array.

Example 12 may include the apparatus of any of Examples 7 to 11, wherein a size of the range of the second level memory corresponds to one of a size of the entire second level memory, a size of a pre-determined address range, a size of a super line, a size of a set of ways, and a size of a subset of ways.

Example 13 may include a method of controlling a memory, comprising determining if a memory request for a second level memory results in a miss with respect to a first level memory, determining if a range of the second level memory corresponding to the memory request is unwritten, if the memory request results in the miss with respect to the first level memory, and blanking a corresponding range of the first level memory if the range of the second level memory corresponding to the memory request is determined to be unwritten.

Example 14 may include the method of Example 13, further comprising setting an indicator flag to indicate whether or not a range of the second level memory is unwritten.

Example 15 may include the method of Example 14, further comprising determining if the range of the second level memory corresponding to the memory request is unwritten based on the indicator flag.

Example 16 may include the method of Example 14, further comprising zeroing the corresponding range of the first level memory if the indicator flag indicates that the range of the second level memory corresponding to the memory request is unwritten.

Example 17 may include the method of Example 13, further comprising determining if the range of the second level memory corresponding to the memory request is unwritten based on an indicator bit in a tag array.

Example 18 may include the method of any of Examples 13 to 17, wherein a size of the range of the second level memory corresponds to one of a size of the entire second level memory, a size of a pre-determined address range, a size of a super line, a size of a set of ways, and a size of a subset of ways.

Example 19 may include at least one computer readable medium, comprising a set of instructions, which when executed by a computing device, cause the computing device to determine if a memory request for a second level memory results in a miss with respect to a first level memory, determine if a range of the second level memory corresponding to the memory request is unwritten, if the memory request results in the miss with respect to the first level memory, and blank a corresponding range of the first level memory if the range of the second level memory corresponding to the memory request is determined to be unwritten.

Example 20 may include the at least one computer readable medium of Example 19, comprising a further set of instructions, which when executed by the computing device, cause the computing device to set an indicator flag to indicate whether or not a range of the second level memory is unwritten.

Example 21 may include the at least one computer readable medium of Example 20, comprising a further set of instructions, which when executed by the computing device, cause the computing device to determine if the range of the second level memory corresponding to the memory request is unwritten based on the indicator flag.

Example 22 may include the at least one computer readable medium of Example 20, comprising a further set of instructions, which when executed by the computing device, cause the computing device to zero the corresponding range of the first level memory if the indicator flag indicates that the range of the second level memory corresponding to the memory request is unwritten.

Example 23 may include the at least one computer readable medium of Example 19, comprising a further set of instructions, which when executed by the computing device, cause the computing device to determine if the range of the second level memory corresponding to the memory request is unwritten based on an indicator bit in a tag array.

Example 24 may include the at least one computer readable medium of any of Examples 19 to 23, wherein a size of the range of the second level memory corresponds to one of a size of the entire second level memory, a size of a pre-determined address range, a size of a super line, a size of a set of ways, and a size of a subset of ways.

Example 25 may include a memory controller apparatus, comprising means for determining if a memory request for a second level memory results in a miss with respect to a first level memory, means for determining if a range of the second level memory corresponding to the memory request is unwritten, if the memory request results in the miss with respect to the first level memory, and means for blanking a corresponding range of the first level memory if the range of the second level memory corresponding to the memory request is determined to be unwritten.

Example 26 may include the apparatus of Example 25, further comprising means for setting an indicator flag to indicate whether or not a range of the second level memory is unwritten.

Example 27 may include the apparatus of Example 26, further comprising means for determining if the range of the second level memory corresponding to the memory request is unwritten based on the indicator flag.

Example 28 may include the apparatus of Example 26, further comprising means for zeroing the corresponding range of the first level memory if the indicator flag indicates that the range of the second level memory corresponding to the memory request is unwritten.

Example 29 may include the apparatus of Example 25, further comprising means for determining if the range of the second level memory corresponding to the memory request is unwritten based on an indicator bit in a tag array.

Example 30 may include the apparatus of any of Examples 25 to 29, wherein a size of the range of the second level memory corresponds to one of a size of the entire second level memory, a size of a pre-determined address range, a size of a super line, a size of a set of ways, and a size of a subset of ways.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
   a processor;
   a multi-level memory communicatively coupled to the processor, the multi-level memory including a first level memory and a second level memory; and
   logic communicatively coupled to the processor and the multi-level memory to:
   determine if a memory request for the second level memory results in a miss with respect to the first level memory,
   determine if a range of the second level memory corresponding to the memory request is unwritten when it is determined that the memory request results in the miss with respect to the first level memory, and
   blank a range of the first level memory corresponding to the range of the second level memory based on a determination that the second level memory is unwritten.

2. The system of claim 1, wherein the logic is further to:
   set an indicator flag to indicate whether any range of the second level memory is unwritten.

3. The system of claim 2, wherein the logic is further to:
   determine if the range of the second level memory corresponding to the memory request is unwritten based on the indicator flag.

4. The system of claim 2, wherein the logic is further to:
   zero the corresponding range of the first level memory if the indicator flag indicates that the range of the second level memory corresponding to the memory request is unwritten.

5. The system of claim 1, wherein the logic is further to:
   determine if the range of the second level memory corresponding to the memory request is unwritten based on an indicator bit in a tag array.

6. The system of claim 1, wherein a size of the range of the second level memory corresponds to one of a size of the entire second level memory, a size of a pre-determined address range, a size of a super line, a size of a set of ways, and a size of a subset of ways.

7. A semiconductor package apparatus, comprising:
   a substrate; and
   logic coupled to the substrate, wherein the logic is at least partly implemented in one or more of configurable logic and fixed-functionality hardware logic, the logic coupled to the substrate to:
   determine if a memory request for a second level memory results in a miss with respect to a first level memory,
   determine if a range of the second level memory corresponding to the memory request is unwritten when it is determined that the memory request results in the miss with respect to the first level memory, and
   blank a range of the first level memory corresponding to the range of the second level memory based on a determination that the second level memory is unwritten.

8. The apparatus of claim 7, wherein the logic is further to:
   set an indicator flag to indicate whether any range of the second level memory is unwritten.

9. The apparatus of claim 8, wherein the logic is further to:
   determine if the range of the second level memory corresponding to the memory request is unwritten based on the indicator flag.

10. The apparatus of claim 8, wherein the logic is further to:
    zero the corresponding range of the first level memory if the indicator flag indicates that the range of the second level memory corresponding to the memory request is unwritten.

11. The apparatus of claim 7, wherein the logic is further to:

determine if the range of the second level memory corresponding to the memory request is unwritten based on an indicator bit in a tag array.

12. The apparatus of claim 7, wherein a size of the range of the second level memory corresponds to one of a size of the entire second level memory, a size of a pre-determined address range, a size of a super line, a size of a set of ways, and a size of a subset of ways.

13. A method of controlling a memory, comprising:
determining if a memory request for a second level memory results in a miss with respect to a first level memory;
determining if a range of the second level memory corresponding to the memory request is unwritten when it is determined that the memory request results in the miss with respect to the first level memory; and
blanking a range of the first level memory corresponding to the range of the second level memory based on a determination that the second level memory is unwritten.

14. The method of claim 13, further comprising:
setting an indicator flag to indicate whether any range of the second level memory is unwritten.

15. The method of claim 14, further comprising:
determining if the range of the second level memory corresponding to the memory request is unwritten based on the indicator flag.

16. The method of claim 14, further comprising:
zeroing the corresponding range of the first level memory if the indicator flag indicates that the range of the second level memory corresponding to the memory request is unwritten.

17. The method of claim 13, further comprising:
determining if the range of the second level memory corresponding to the memory request is unwritten based on an indicator bit in a tag array.

18. The method of claim 13, wherein a size of the range of the second level memory corresponds to one of a size of the entire second level memory, a size of a pre-determined address range, a size of a super line, a size of a set of ways, and a size of a subset of ways.

19. A method of controlling a memory, comprising:
determining if a memory request for a second level memory results in a miss with respect to a first level memory;
determining if a range of the second level memory corresponding to the memory request is unwritten when it is determined that the memory request results in the miss with respect to the first level memory; and
blanking a range of the first level memory corresponding to the range of the second level memory based on a determination that the second level memory is unwritten.

20. The at least one computer readable medium of claim 19, comprising a further set of instructions, which when executed by the computing device, cause the computing device to:
set an indicator flag to indicate whether any range of the second level memory is unwritten.

21. The at least one computer readable medium of claim 20, comprising a further set of instructions, which when executed by the computing device, cause the computing device to:
determine if the range of the second level memory corresponding to the memory request is unwritten based on the indicator flag.

22. The at least one computer readable medium of claim 20, comprising a further set of instructions, which when executed by the computing device, cause the computing device to:
zero the corresponding range of the first level memory if the indicator flag indicates that the range of the second level memory corresponding to the memory request is unwritten.

23. The at least one computer readable medium of claim 19, comprising a further set of instructions, which when executed by the computing device, cause the computing device to:
determine if the range of the second level memory corresponding to the memory request is unwritten based on an indicator bit in a tag array.

24. The at least one computer readable medium of claim 19, wherein a size of the range of the second level memory corresponds to one of a size of the entire second level memory, a size of a pre-determined address range, a size of a super line, a size of a set of ways, and a size of a subset of ways.

* * * * *